United States Patent [19]

Kohli

[11] Patent Number: 4,594,373

[45] Date of Patent: Jun. 10, 1986

[54] CURABLE EPOXY RESIN COMPOSITIONS

[75] Inventor: Dalip K. Kohli, Norwalk, Conn.

[73] Assignee: American Cyanamid Company, Stamford, Conn.

[21] Appl. No.: 714,137

[22] Filed: Apr. 26, 1985

Related U.S. Application Data

[62] Division of Ser. No. 578,402, Feb. 9, 1984, Pat. No. 4,521,583.

[51] Int. Cl.⁴ .................. C08L 63/00; C08K 3/04
[52] U.S. Cl. ..................... 523/400; 523/468; 525/523; 528/119; 528/120
[58] Field of Search ............... 528/119, 120; 525/523; 523/400, 468

[56] References Cited

U.S. PATENT DOCUMENTS

| | | | |
|---|---|---|---|
| 3,386,956 | 6/1968 | Nawakowski et al. | 528/119 |
| 3,407,175 | 10/1968 | Presley et al. | 528/119 |
| 4,269,759 | 5/1981 | Edelman | 523/468 |
| 4,304,694 | 12/1981 | Scola et al. | 523/468 |
| 4,436,890 | 3/1984 | Kaufman | 523/119 |

*Primary Examiner*—Lewis T. Jacobs
*Attorney, Agent, or Firm*—William H. Calnan

[57] ABSTRACT

Curable compositions comprising substituted bisurea catalyzed epoxide prepolymers alone, or with aromatic polyamine curing agents, alone, or in further combination with reinforcements, e.g., graphite fibers, and optionally modified with second resins are disclosed. The cured resin fiber matrix compositions exhibit high toughness combined with excellent hot/wet strength.

10 Claims, 2 Drawing Figures

CURABLE EPOXY RESIN COMPOSITIONS

This is a division of application Ser. No. 578,402, filed Feb. 9, 1984, U.S. Pat. No. 4,521,583, issued June 4, 1985.

FIELD OF THE INVENTION

This invention relates to improved epoxy resin compositions. In addition, it relates to curable epoxy resin compositions comprising reinforcing filaments and epoxy prepolymers, cured with a series of substituted bisurea catalysts derived from aryl monoisocyanates and diamines, alone, or combined with aromatic polyamines.

BACKGROUND OF THE INVENTION

Epoxy resin compositions are useful to encapsulate electronic components, and as structural adhesives, and the like. Reinforced epoxy resin composites having high strength to weight ratios have found extensive use in the aircraft and aerospace industries, and in other applications where strength, corrosion resistance and light weight are desirable. For instance, fiber resin matrix materials have replaced aluminum and other metals in primary and secondary structures of modern military and commercial aircraft. Sporting equipment such as tennis rackets and golf clubs have also adopted fiber resin materials successfully.

Epoxy resin compositions and fiber modifications are abundant. Since the advent of fiber resin matrix materials, much effort has been expended in improving their properties and characteristics, including the development of many curing systems.

It is known to add curing agents functioning as accelerators or catalysts such as substituted ureas and boron trifluoride-amine complexes to such epoxy compositions to cure them, and also to significantly decrease the hardening temperature of such resin systems. Substituted ureas made from monoamines and polyisocyanates and used for this purpose are described, for example, in U.S. Pat. Nos. 3,386,955 and 894,113 as well as in U.S. patent application Ser. No. 518,879, filed Aug. 1, 1983, U.S. Pat. No. 4,558,078, issued Dec. 10, 1985, and the use of boron trifluoride-amine complexes is also described and claimed in the latter. While such curing agents do lower gel times, they tend to lower the mechanical properties of high performance epoxy resins, especially those containing tetraglycidyldiaminodiphenylmethane. Although they increase resin toughness, they lower hot/wet properties and glass transition temperatures.

Amine and polyamine curing agents have received wide acceptance for use alone with epoxys, or in combination with the substituted urea curing agents or the boron trifluoride-amine complexes. Among these can be mentioned, for example, polyamino aromatic compounds, such as m-phenylenediamine, 4,4'-diaminodiphenyl methane and 3,3'diaminodiphenyl sulfone, as well as the aminobenzoates disclosed in U.K. Pat. No. 1,182,377, U.S. Pat. No. 3,932,360, and in Gillham, Organic, Coatings and Applied Polymer Science Proceedings, Vol. 46, p 592–598, March–April 1982. Such aromatic polyamines are effective as curing agents for a variety of polyepoxides, and the resulting cured compositions are useful as films, moldings, coatings and glass-reinforced laminates. While there is generally no indication in the properties presented in the prior art that the curing agents exemplified therein will produce the combination of toughness and strength under hot/wet conditions essential for use in the above-mentioned structural applications, the said copending application Ser. No. 518,879 describes fiber resin matrices comprising reinforcing filaments in a heat-curable epoxy resin composition comprising an epoxy prepolymer and a novel family of aromatic polyamine curing agents. The application describes neat resin formulations having, after cure, improved physical properties, e.g., higher elongation and satisfactory hot/wet modulus. Moreover, the epoxy compositions, cured with filaments, and catalyzed, exhibit improved inter-laminar toughness and residual compression strength after impact, while maintaining compression strength under hot/wet conditions.

It has now been discovered that a particular family of bisurea catalysts can be obtained by reacting an aryl monoisocyanate with an organic diamine, and that their use with epoxys alone or in further combination with polyamines provides desirable temperature-viscosity profiles during cure and unexpected resistance to degradation in hot/wet properties, as well as retention of thermal properties.

SUMMARY OF THE INVENTION

According to the present invention, there are provided heat curable compositions comprising:

(a) an epoxy prepolymer or combination of prepolymers having more than one epoxide group per molecule, and (b)(i) an amount effective to cure said epoxy (a) of a bisurea compound comprising the reaction product of an aryl monoisocyanate and an organic diamine, alone, or in further combination with (b)(ii) an amount effective to cure of an amine functional aromatic curing agent.

Such compositions are useful in adhesives, potting compounds, encapsulating resins, molding resins, coatings and the like.

Also provided are such compositions combined with fibrous reinforcements and a modifying resin. According to this aspect there are provided fiber resin matrix compositions comprising A. reinforcing filaments, and B. a heat-curable epoxy resin composition comprising:

(a) an epoxy prepolymer or combination of prepolymers having more than one epoxide group per molecule, and (b)(i) an amount effective to cure said epoxy of a bisurea compound comprising the reaction product of an aryl monoisocyanate and an organic diamine, alone or in further combination with (b)(ii) an amount effective to cure said epoxy (a) of an amine functional aromatic amine curing agent, alone, or in further combination with (c) a second homogeneous or heterogeneous resin component blended and alloyed with components (a), (b)(i) and (b)(ii) in an amount sufficient to enhance toughness and resistance to failure under hot/wet stress conditions in composites produced from said composition. Resins of type (c) can be present homogeneously and also in the form known as interpenetrating polymer networks.

Preferably, in such compositions, in component B, (a) comprises 100 parts by weight, component (b)(i) comprises 0.25 to 20 parts by weight, (b)(ii) comprises 10 to 55 parts by weight, and component (c) comprises 5 to 50 parts by weight per 100 parts by weight total of B.

A preferred series of accelerators (b)(i) according to this invention is of the formula

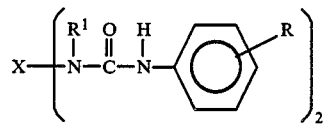

wherein X is a divalent organic hydrocarbon radical, a divalent or trivalent hetero-interrupted hydrocarbon radical, or a divalent inertly-substituted hydrocarbon radical, R is hydrogen, a monovalent hydrocarbon radical, an amino or hydrocarbon substituted amino radical, a cyano radical, a hydrocarbonoxy radical or an inertly-substituted such radical, and $R^1$ is, independently, hydrogen, a monovalent hydrocarbon radical, an inertly-substituted hydrocarbon radical, a single bond, or a divalent alkylene radical or inertly-substituted such radical.

Especially preferred are bisureas of the above formula wherein X is a divalent alkylene radical of from 2 to 12 carbon atoms, a trivalent nitrogen-interrupted alkylene radical of 4 to 12 carbon atoms, a divalent arylene or polyarylene radical of 6 to 30 carbon atoms interrupted with $-CR^2{}_2-$, $-O-$, $-S-$ or $-SO_2-$ groups, wherein $R^2$ is hydrogen, a monovalent hydrocarbon radical or an inertly-substituted hydrocarbon radical, R is hydrogen, cyano, amino, methoxy, vinyl or ethinyl, and $R^1$ is hydrogen, alkyl of 1 to 6 carbon atoms, aryl of 6 to 12 carbon atoms, or divalent alkylene of from 2 to 3 carbon atoms.

Special mention is made of the most preferred bisureas. These are of the above formula wherein X is divalent alkylene of from 2 to 12 carbon atoms, trivalent nitrogen-interrupted alkylene of from 4 to 12 carbon atoms, divalent diaryl sulfone of from 12 to 20 carbon atoms, R is hydrogen, amino, vinyl, methoxy or ethinyl, and $R^1$ is hydrogen, or alkyl of 1 to 6 carbon atoms, or divalent alkylene of from 2 to 3 carbon atoms.

The term "inertly-substituted" as used herein means bearing substituents which will not react with epoxide groups, i.e., generally free of active hydrogen.

DESCRIPTION OF THE PREFERRED EMBODIMENTS

Figure 1:
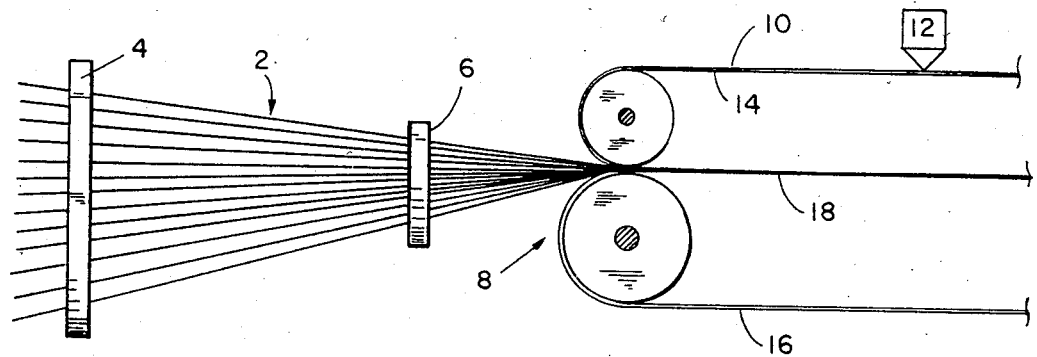
FIG. 1 is a schematic of one method for preparing a fiber resin matrix prepreg tape of the present invention.

The curing catalysts of this invention are prepared by reacting an aryl isocyanate with a diamine in a solvent, such as toluene, acetonitrile, or tetrahydrofuran, and the like, in accordance with the following:

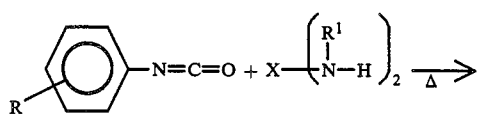

-continued

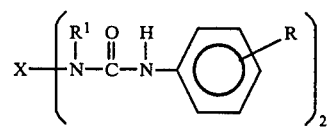

The reaction conditions are not particularly critical. At least two moles of isocyanate are used per mole of diamine. Temperatures can be ambient, e.g., 20°–25° C., or mild heating up to 100° C. can be used. The reaction is over in a relatively short period of time, one hour usually being adequate. The products are recovered in conventional fashion, usually by precipitation, filtration and drying. They are usually obtained as white, crystalline solids, and can be further purified, if desired, by conventional means, such as by recrystallization.

The starting materials are either commercially available, or they can easily be made. Among the aryl-monoisocyanates which can be employed are: phenyl isocyanate, 4-methylphenyl isocyanate, 4-methoxyphenyl isocyanate, 4-acetaminophenyl isocyanate, 4-cyanophenyl isocyanate, 4-vinylphenyl isocyanate, 4-ethinylphenyl isocyanate, 4-isopropenylphenyl isocyanate, 1-naphthyl isocyanate, 4-phenyl isocyanate, the 2- and 3-substituted isomers thereof, and the like. Preferably, phenyl isocyanate will be used.

The diamines likewise are available from a number of commercial sources and can be readily prepared by those skilled in this art. They will comprise diprimary, disecondary and mixed diprimary and disecondary amines. Illustrative are ethylenediamine, 1,3-propylenediamine, 1,2-propylenediamine, 1,4-tetramethylenediamine, 1,6-hexamethylenediamine, 1,12-dodecamethylene diamine, N,N'-dimethylethylenediamine, N,N'-diethyl-1,3-propanediamine, diethanolamine, N,N'-dimethylethanolamine, piperazine, N-(2-aminoethyl)piperazine, and the like. The preferred diamines comprise N,N'-dimethyl-1,6-hexamethylenediamine, N,N'-diethyl-1,3-propane-diamine, piperazine, N-(2-aminoethyl)piperazine and 1,3-propanediamine.

In general, the resin compositions of this invention are prepared by mixing the polyepoxide compounds with the bisurea catalyst (b)(i) in quantities, e.g., of 0.1 to 5 parts by weight per 100 parts by weight based on the epoxide. If polyamines (b)(ii) are to be included, they will be added in conventional quantitative ratios, e.g., 1 epoxide equivalent to 0.3 to 3.0 NH— equivalents, preferably 1.0 to 3.0 NH— equivalents, and especially preferably 1.5 to 2.5 NH— equivalents. Mixing is accomplished optionally with heating, e.g., at a temperature in the range of 30° to 160° C., preferably at a temperature in the range of 80° to 140° C., until a melt is obtained and stirring is continued for a few additional minutes. The melt can then be poured into a mold and reacted, for example, for 2 hours at 135° C. and then for 3 hours at 180° C., to form castings. The castings can then be cut into coupons and tested. They show outstanding flexural and thermal properties. The NH— equivalents is the quantity of aromatic polyamine in grams in which 1 gram—atom of hydrogen combined with amine nitrogen is present.

Fillers, pigments, dyes, reinforcements, such as glass fibers or woven cloths, plasticizers, and mixtures thereof, may be added to the epoxy resin-bisurea catalyst composition before the reaction in order to modify ultimate properties, in known ways. Applications can also be made by trowelling, brush coating, immersion or dip-coating, spraying or any other convenient method.

The fiber resin matrix compositions according to the present invention can be prepared by embedding filaments, e.g., glass fibers and/or non-siliceous filaments in a curable resin composition to form a fiber resin matrix which can be manipulated and cured to a solid composite. Particular selection of the filament material, epoxy prepolymer, curing agent(s), and thermoplastic resin as well as including optional ingredients such as fillers, dyes, processing aids, etc., can give a range of curable compositions heretofore unknown in the art and exhibiting improved physical properties over known materials.

Glass filaments useful herein are well known. Non-siliceous filament components may be of any non-glass, non-silicon dioxide-containing material which improves the strength or other physical properties of the curable epoxy resin component (described infra.). Such filaments include, but are not limited to, filaments comprised of carbon, graphite, silicon carbide, boron, aramid, polyester, polyamide, rayon, polybenzimidazole, polybenzothiazole, metal-coated such filaments, for example nickel-coated and/or silver-coated graphite fibers and filaments, or combinations of such filaments. Fibers (woven or non-woven), tows or mats of such filaments, or tapes (unwoven, flat bundles of the unidirectional filaments) may be employed as desired. In applications demanding high stiffness to weight ratio or shear strength, carbon fibers, graphite filaments, polyaramid filaments or nickel-plated graphite filaments, as disclosed in assignee's copending application Ser. No. 358,637 are most preferred.

The epoxy resins suitable for the present invention are compounds having more than one epoxide group per molecule available for reaction with the primary and secondary polyamines of the present invention (described infra.). Such epoxy prepolymers include but are not limited to, polyglycidyl ethers of polyvalent phenols, for example pyrocatechol; resorcinol; hydroquinone; 4,4'-dihydroxydiphenyl methane; 4,4'-dihydroxy-3,3'-dimethyldiphenyl methane; 4,4'-dihydroxdphenyl dimethyl methane; 4,4'-dihydroxydiphenyl methyl methane; 4,4'-dihydroxydiphenyl cyclohexane; 4,4'-dihydroxy-3,3'-dimethyldiphenyl propane; 4,4'-dihydroxydiphenyl sulphone; or tris-(4-hydroxyphenyl) methane; polyglycidyl ethers of the chlorination and bromination products of the above-mentioned diphenols; polyglycidyl ethers of novolacs (i.e., reaction products of monohydric or polyhydric phenols with aldehydes, formaldehyde in particular, in the presence of acid catalysts); polyglycidyl ethers of diphenols obtained by esterifying 2 mols of the sodium salt of an aromatic hydroxycarboxylic acid with 1 mol. of a dihalogenalkane or dihalogen dialkyl ether (U.K. No. 1,017,612); and polyglycidyl ethers of polyphenols obtained by condensing phenols and long-chain halogen paraffins containing at least 2 halogen atoms (U.K. No. 1,024,288).

Other suitable compounds include polyepoxy compounds based on aromatic amines and epichlorohydrin, for example N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; and N-diglycidyl-4-aminophenyl glycidyl ether. Special mention is made of N,N,N',N'-tetraglycidyl-1,3-propylene bis(4-aminobenzoate).

Glycidyl esters and/or epoxycyclohexyl esters of aromatic, aliphatic and cycloaliphatic polycarboxylic acids, for example phthalic acid diglycidyl ester and adipic ester diglycidyl and glycidyl esters of reaction products of 1 mol of an aromatic or cycloaliphatic dicarboxylic acid anhydride and 1/2 mole of a diol or 1/n mol of a polyol with n hydroxyl groups, or hexahydrophthalic acid diglycidyl esters, optionally substituted by methyl groups, are also suitable.

Glycidyl ethers of polyhydric alcohols, for example of 1,4-butanediol; 1,4-butenediol; glycerol; 1,1,1-trimethylol propane; pentaerythritol and polyethylene glycols may also be used. Triglycidyl isocyanurate; and polyglycidyl thioethers of polyvalent thiols, for example of bis mercaptomethylbenzene; and diglycidyl-trimethylene sulphone, are also suitable.

Preferably the epoxy prepolymer component will be selected from compounds having the idealized formula:

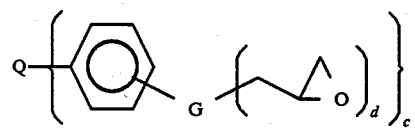

and halogen and alkyl substituted derivatives of such compounds, wherein c is 2, 3 or 4 and equal to the valence of Q; Q is a divalent, trivalent or tetravalent radical; G is —O—, NR'— or —N—; R is hydrogen or alkyl; and d is 1 or 2 depending on the valence of G.

The most preferred epoxy compounds will include the following:

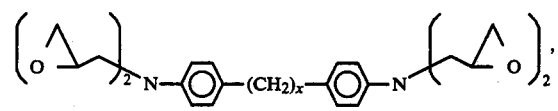

wherein x is an integer for 1 to 4, available commercially (where x=1) as Araldite ® MY-720 (Ciba-Geigy);

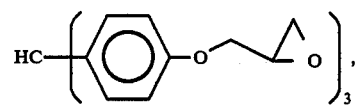

available commercially as XD7342 (Dow Chemical);

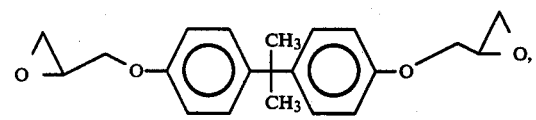

availabe commerically a DER331 (Dow Chemical) or EPON ® 828 (Shell);

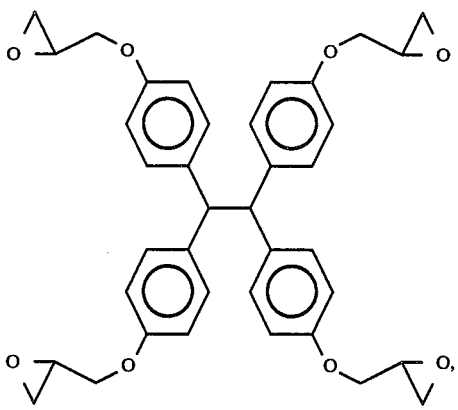

available commerically as EPON ® 1031 (Shell);

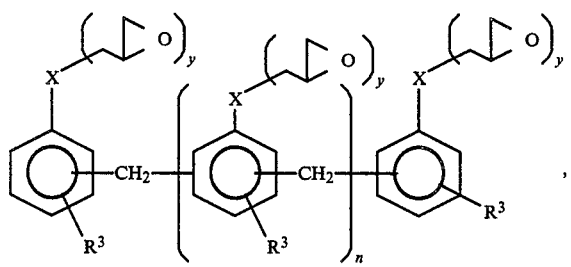

wherein Y is 1 or 2, X is —O— or —N—, $R^3$ is H or $CH_3$ and n is 2 to 8.

Compounds in which X is —O— are available as a mixture under the tradename DEN-438 from Dow Chemical Company.

Also preferred are triglycidyl ethers of meta- and para-hydroxyaniline, e.g., represented by the formula:

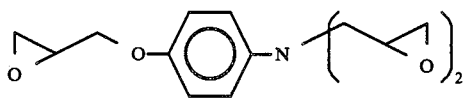

These are available under the tradename ARALDI-TE ® 0500, 0510 from Ciba-Geigy.

In general any polyaminoaromatic compound conventionally used for curing such epoxide prepolymers can be used in this invention. For example, m- and p-phenylenediamine, diaminonaphthalene, 4,4'-diaminodiphenylmethane, 4,4'-diaminodiphenylsulfone, 3,3'-diaminodiphenylsulfone, 4,4'-diaminodiphenylether, and the like, can be used. Among these, 3,3'-diaminodiphenylsulfone is preferred.

For those compositions which contain component (b)(ii), an especially preferred series of polyamine curing agents are of the formula:

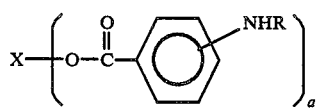

wherein a is 2 or 3, R is hydrogen alkyl or aryl, and X is a divalent or trivalent organic hydrocarbon, hetero-interrupted hydrocarbon, or substituted hydrocarbon radical or —N—. They may be prepared from corresponding starting materials, e.g., nitro compounds, by reduction, for example, according by methods described in U.K. Pat. No. 1,182,377. In addition, commonly assigned U.S. application Ser. No. 518,863 filed Aug. 1, 1983, shows an elegant method for N-methylation, using succinimide and formaldehyde with the primary amine, followed by reductive cleavage.

Preferred aromatic polyamine curing agents (b)(ii) are compounds according to the above formula in which R is hydrogen, $C_1$-$C_3$ alkyl, or phenyl and X is a divalent or trivalent radical of valence a, selected either from (1) a divalent group consisting of —$(CH_2)_y$—, wherein y is an integer of from 2 to 12, —($CH_2CH_2OCH_2CH_2OCH_2CH_2$)—,

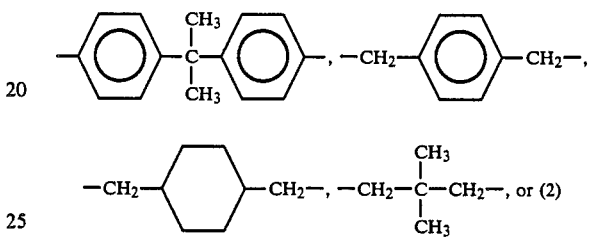

a trivalent group consisting of —N—
and —$(CH_2)_n$—CH— $(CH_2)_m$—, wherein n and m are the same or different integers from 1 to 4.

More preferred curing agents are the following:

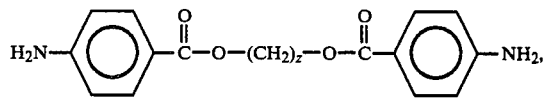

wherein z is an integer of from 2 to 12, preferably 2 to 6,

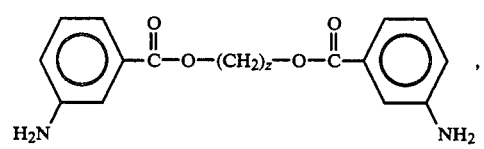

wherein z is an integer from 2 to 12, preferably 2 to 6,

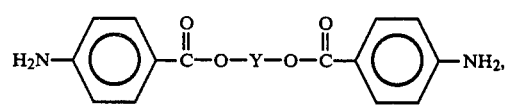

wherein Y is —$CH_2CH_2OCH_2CH_2OCH_2CH_2$—,

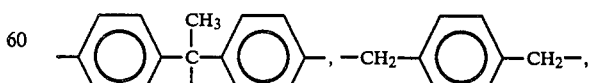

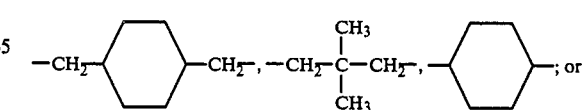

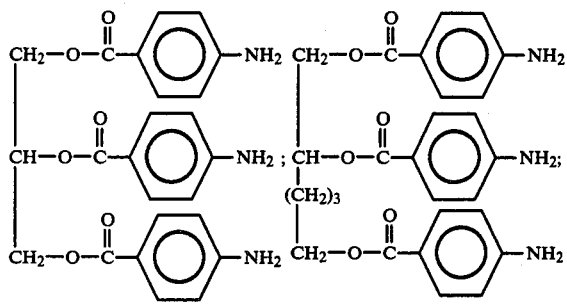

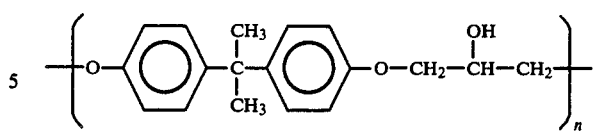

and polyetherimide resins derived from the reaction product of bisphenol-A and a substituted phthalic anhydride, subsequently reacted with m-phenylenediamine and containing units of the formula:

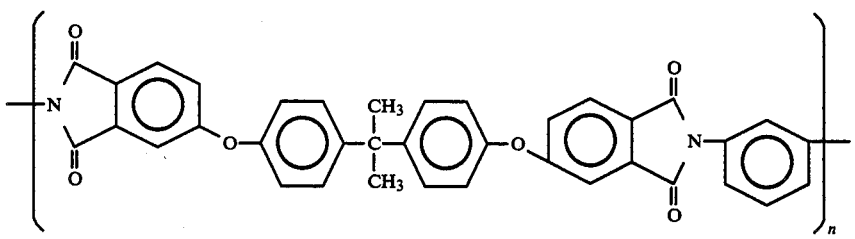

wherein n in each is a number sufficient to provide a molecular weight in the range of 20,000 to 60,000. Amounts of 5 to 30, preferably 10 to 20 parts by weight per 100 parts by weight of epoxy prepolymer can be used. Such polymers are available commercially, respectively, from Union Carbide Co., Danbury, Conn., U.S.A., under the tradename PKHH resin and from General Electric Company, Fairfield, Conn., U.S.A., under the tradename, ULTEM resin. Their use in epoxy systems is described in the above-mentioned Ser. No. 518,879.

Other resins which can be used as thermoplastic modifiers include reactive and non-reactive butadiene-styrene-acrylonitrile core-shell modifiers, polyurethanes, nylons, carboxylated acrylonitrile-butadiene elastomers, e.g., those described in the above-mentioned U.S. Pat. No. 3,894,113, and many others. They will, in general, have molecular weights in the range of 5,000 to 60,000, and will be used in amounts set forth above.

One method of forming the fiber matrix composition of the invention is illustrated in the drawings. As seen in FIG. 1, the basic fiber matrix material is produced by delivering fiber 2 through conventional eyeboards 4 and 6 to a pressure roller assembly 8. The resin composition is coated in a layer 10 from a conventional film coating applicator 12 onto a substrate such as release paper 14 and passed through the pressure roller assembly 8. Release paper 16 is also delivered to the pressure roller assembly 8.

The pressure rollers 8 are set at a temperature and pressure for imbedding the fibers 2 in the resin layer 10 to form a fiber matrix composition 18. Practice has taught that a temperature in the range of 190° F. and pressures of one thousand pounds over fifteen inch centers are suitable for producing fiber resin prepreg tape 18.

The fibers 2, the substrate 14 with resin layer 10 and the release paper 16 are delivered to the presssure rollers 8 and passed therethrough at the rate of 5–20 feet/minute.

The feed of fiber 2 and resin layer 10 to the pressure rollers 8 is selected to produce a fiber matrix of about twenty to sixty weight percent resin and about eighty to forty weight percent fiber. For example, one hundred

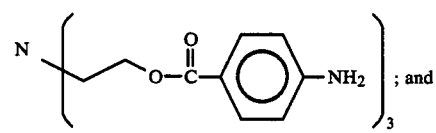

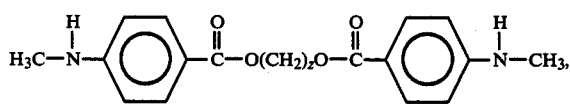

wherein z is an integer of from 2 to 12, preferably 2 to 6.

In the most preferred compounds, the primary diamine will include one or more of a compound of the formula:

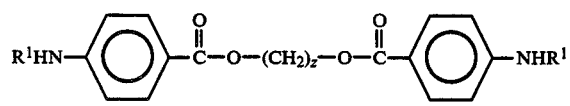

wherein $R^1$ is hydrogen or $C_1$–$C_6$ alkyl, e.g., methyl, and z is an integer of from 2 to 12, preferably 2 to 6, and most preferably 3. Also contemplated are the use of such compounds in combination with other conventional polyamines such as methylene dianiline, phenylene diamine, and the like.

The matrix resin compositions benefit from the inclusion of a resin modifier in an amount sufficient to impart improvements in mechanical properties, especially toughness, while preserving substantial resistence to failure under hot/wet conditions. Such resins can be present homogeneously and also in the form known as interpenetrating polymer networks. Particularly useful in this aspect are polyether resins derived from bisphenol A and epichlorohydrin, and which include repeating units of the formula:

twenty spools of 6 K carbon fibers are delivered within a twelve inch width to the pressure rollers 8 with a layer of resin 0.009 to 0.0013 pounds per square foot. The resulting fiber resin matrix 18 results in a generally parallel array of fibers, shown by FIG. 2.

Fillers, pigments, dyes, and other such conventional additives and processing aids may be added to the fiber matrix compositions of the invention before curing to influence the properties of the final resin composite.

The following examples will illustrate the practice of the present invention and are provided by way of demonstration and not by way of limitation.

The following procedure is used to prepare and cure neat resin compositions: the epoxide prepolymer is melted, and mixed with the bisurea at 100° C. for 10 minutes. If a polyamine is used, the epoxide prepolymer and the polyamine component are mixed at 135° C. for 10 minutes, and cooled to 100° C., the bisurea catalyst is mixed in, and the mixture is degassed for 10 minutes. The liquid resin is then poured into a mold and cured for 2 hours at 135° C. and for 3 hours at 180° C. Properties are determined on coupons cut from the castings by the following procedures: The flexural test is described in ASTM D-790, Method I. Dynamic mechanical analysis was performed on a Dupont 981 Dynamic Mechanical Analyzer, and $T_g$ was defined as the temperature at which the loss tangent, tan σ, is a maximum. ASTM D4065 test method covers this type of $T_g$ measurement. Conditioning before testing is described by the phrases "wet" and "dry". "Wet" refers to conditioning for two weeks at 71° C., immersing in distilled water, prior to testing at 93° C. "Dry" means testing a sample, as prepared, at 23° C.

EXAMPLES 1-6

The series of substituted bisureas were prepared by stirring solutions of acetonitrile of phenyl isocyanate and the corresponding diamines for 0.5 to 2.0 hours, and isolating by filtration. The reactants used and the products obtained are outlined in Table 1:

TABLE 1
PREPARATION OF SUBSTITUTED BISUREAS

| EXAMPLE | ISOCYANATE | DIAMINE | BISUREA | MELTING POINT, °C. |
|---|---|---|---|---|
| 1 | Ph—N=C=O | $CH_3NH-(CH_2)_6-NHCH_3$ | Ph—N(H)—C(O)—N($CH_3$)—($CH_2)_6$—N($CH_3$)—C(O)—N(H)—Ph | 138-140 |
| 2 | Ph—N=C=O | $CH_3CH_2NH-(CH_2)_3NHCH_2CH_3$ | Ph—N(H)—C(O)—N($C_2H_5$)—($CH_2)_3$—N($C_2H_5$)—C(O)—N(H)—Ph | 125-126 |
| 3 | Ph—N=C=O | $H_2N-(CH_2)_6-NH_2$ | Ph—N(H)—C(O)—N(H)—($CH_2)_6$—N(H)—C(O)—N(H)—Ph | — |
| 4 | Ph—N=C=O | $H_2N-(CH_2)_3-NH_2$ | Ph—N(H)—C(O)—N(H)—($CH_2)_3$—N(H)—C(O)—N(H)—Ph | 223-224 |
| 5 | Ph—N=C=O | H—N(piperazine)N—H | Ph—N(H)—C(O)—N(piperazine)N—C(O)—N(H)—Ph | 250 |
| 6 | Ph—N=C=O | $H_2N-(CH_2)_2$—N(piperazine)NH | Ph—N(H)—C(O)—N(H)—($CH_2)_2$—N(piperazine)N—C(O)—N(H)—Ph | 169-171 |

EXAMPLES 7 AND 8

Compositions comprising an epoxy prepolymer, the catalyst of Example 2, alone, and with two different diamines were prepared and gel time measurements were made isothermally at 180° C. For comparison purposes, a bisurea catalyst of the prior art, U.S. Pat. No. 3,386,955, Example 1, was also included. The formulations used and the results obtained are set forth in Table 2:

TABLE 2
HEAT CURABLE COMPOSITIONS

| EXAMPLE | 7A* | 7B* | 7 | 7C* | 8 |
|---|---|---|---|---|---|
| COMPOSITION (parts by weight) | | | | | |
| N,N,N',N'—tetra-glycidyl 4,4'-diamino diphenyl methane | 100 | 100 | 100 | 100 | 100 |
| Diaminodiphenylsulfone | — | 47 | — | — | — |
| Trimethylene bis(p-amino benzoate) | 47 | — | 47 | 47 | — |
| Reaction product of phenyl isocyanate and N,N—diethyl-1,3-propane diamine (Ex. 2) | — | — | 1.4 | — | 1.4 |
| Reaction product of toluene 2,4-diisocyanate and dimethylamine (U.S. Pat. No. 3,386,955, Ex. 1) | — | — | — | 1 | — |
| PROPERTIES | | | | | |
| Gel time at 180° C. in minutes | 45 | 45 | 30 | 30 | >30 |

*Control.
The practical effect of reducing gel times is demonstrated both by the catalyst of this invention (Example 7) and that of the prior art (Example 7C*).

EXAMPLES 9-13

The general procedure for forming neat resin compositions was used with two catalysts according to this invention. For comparison purposes, an uncatalyzed, cured composition was prepared, as well as one catalyzed with the bisurea of the prior art. The formulations used and the properties obtained are set forth in Table 3.

Figure 2:
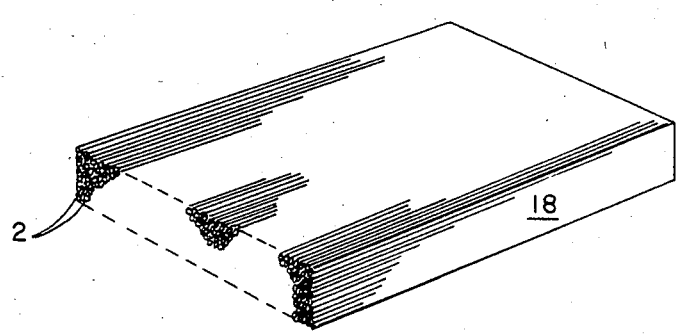
FIG. 2 is an enlarged cross-sectional view of a strip of the fiber resin matrix prepreg tape of the invention.

Using an apparatus shown generally in FIG. 1, prepreg tapes of the structure shown generally in FIG. 2, were prepared:

TABLE 3

BISUREA-CATALYZED EPOXY-POLAMINE CURED COMPOSITIONS AND PROPERTIES

| EXAMPLE | | 9 | 10 | 11 | 12 | 13 | 11A* | 11B* | 11C* |
|---|---|---|---|---|---|---|---|---|---|
| COMPOSITION (parts by weight) | | | | | | | | | |
| N,N,N',N'—tetra-glycidyl 4,4'—diamino diphenyl methane | | 100 | 100 | 100 | 100 | 100 | 100 | 100 | 100 |
| Trimethylene bis(p-amino benzoate) | | 47 | 47 | 47 | 47 | 47 | 47 | 47 | 47 |
| Reaction product of phenyl isocyanate and N,N—dimethyl 1,6-hexamethylene diamine (Ex. 1) | | 1 | 2 | — | — | — | — | — | — |
| Reaction product of phenyl isocyanate and N,N'—diethyl-1,3-propanediamine (Ex. 2) | | — | — | 1 | 2 | 4 | — | — | — |
| Reaction product of toluene 2,4-diisocyanate and dimethylamine | | — | — | — | — | — | 1 | 2 | 4 |
| PROPERTIES | | | | | | | | | |
| Modulus, MSI | dry | 0.52 | 0.57 | 0.48 | 0.48 | 0.48 | 0.49 | 0.66 | 0.72 |
| | wet | 0.31 | 0.29 | 0.30 | 0.28 | 0.27 | 0.29 | 0.11 | 0.03 |
| Strength, KSI | dry | 23.8 | 25.5 | 22.9 | 24.5 | 23.2 | 21.7 | 27.9 | 28.1 |
| Work-to-break, in-lbs./in.$^3$ | dry | 1000 | 970 | 825 | 1220 | 1200 | 1125 | 915 | 630 |
| $T_g$, °C. | dry | 203 | 171 | 207 | 201 | 187 | 197 | 146 | 130 |
| | wet | — | 132 | 160 | 150 | 148 | 139 | 124 | 104 |

*Control.

The degradation in strength and thermal properties caused by the prior art catalyst is ameliorated by using the catalysts of this invention.

EXAMPLE 14

The neat resin procedure was modified by curing at 250° F. for 1.5 hours and the degree of cure was determined by differential scanning calorimetry (DSC). The formulation employed, in parts by weight, was N,N,N',N'-tetraglycidyl-4,4'-diaminodiphenyl methane, 61; bisphenol-A diglycidyl ether, 39; m-diaminodiphenyl sulfone, 40; and the reaction product of phenyl isocyanate and N,N'-diethyl-1,3-propanediamine (Ex. 2), 7. The degree of cure by DSC was 80%, showing excellent latent catalytic activity.

EXAMPLE 15

Two fiber resin matrix formulations were prepared from the following materials:

| component A | CELION ® 6K high strain graphite fiber |
|---|---|
| component (a) | ARALDITE ® MY720 |
| | EPON ® 1031 (see formulae, supra.) |
| catalysts (b)(i) | toluene-2,4-diisocyanate reaction product with dimethylamine (control); phenyl isocyanate reaction product with N,N'—diethyl-1,3-propane-diamine (Ex. 2) |
| (curing agent) (b)(ii) | trimethylene bis-(p-aminobenzoate) |
| polymer modifier (c) | polyether alcohol (PKHH) |

| EXAMPLE | 15A* | 15 |
|---|---|---|
| (28%) Resin Mixture (parts by weight) | | |
| N,N,N'N'—tetra(glycidyl-4,4' diaminodiphenyl)methane | 100 | 100 |
| Trimethylene bis-(para-aminobenzoate) | 48.4 | 48.4 |
| Polymer modifier** | 10 | 10 |
| Catalyst (TDI/DMA) | 1 | — |
| (Ex. 2 herein) | — | 1.4 |
| (72%) Filament (parts by weight) (6K graphite fibers having a strain to failure of about 1.5%) | | |

*Control
**Reaction product of bisphenol A and epichlorohydrin (Union Carbide, PKHH).

These samples were cured and compared against commercial epoxy resin matrixes. The sheets of resin involved were as follows:

Quasi-Isotropic: 16 sheets [(+45/0/90)$_2$]$_s$

The compressive strength was measured on a modified ASTM D695 specimen described in D. H. Woolsencraft et al., Composites, Oct., 1981, pages 275–280. Compressive strength after impact was measured as described in B. A. Byers, NASA Report No. CR 159293, August, 1980. This property is tested by subjecting a cured laminate specimen to 1500 in.-lb. per inch of nominal thickness impact with a 0.62 diameter spherical tip impacter while supported by a rigid base (e.g., 3.5 in. steel cutout). The panel is then tested in compression. The results are set forth in Table 4, as follows:

TABLE 4

| EXAMPLE | CONDITION | 16-PLY QUASIISOTROPIC | | COMPRESSIVE STRENGTH, KSI | | FRACTURE TOUGHNESS GIC IN-LBS./IN$^2$ | COMPRESSIVE STRENGTH AFTER IMPACT PLY (KSI) 1500 in.-lb./in. |
|---|---|---|---|---|---|---|---|
| | | 23° C. | 93° C. | 132° C. | 177° C. | | |
| 15A* | dry | 90 | 73 | 59 | 16 | 2.7 | 38.7 |
| | wet | — | 65 | 43 | — | | |
| 15 | dry | 97 | 91 | 87 | 56 | 2.12 | 33.4 |

TABLE 4-continued

| EXAMPLE | CONDITION | 16-PLY QUASIISOTROPIC COMPRESSIVE STRENGTH, KSI | | | | FRACTURE TOUGHNESS GIC IN-LBS./IN$^2$ | COMPRESSIVE STRENGTH AFTER IMPACT PLY (KSI) 1500 in.-lb./in. |
|---|---|---|---|---|---|---|---|
| | | 23° C. | 93° C. | 132° C. | 177° C. | | |
| | wet | — | 86 | 55 | — | | |

*See above.

The data demonstrate that the reinforced, cured composition according to this invention (Example 15) does not lose its hot/wet compression strength to the same extent as the other two catalyzed matrix compositions (15A*).

EXAMPLE 16

A resin composition is prepared by mixing the following (by weight)

| | | |
|---|---|---|
| (a) | N,N,N',N'—tetraglycidyl-4,4' diamino diphenyl methane | 100 parts |
| (b) | Polyether polyimide resin (General Electric Ultem, formula above) | 15 parts |
| (c) | trimethylene bis(p-amino-benzoate) | 48 parts |
| (d) | reaction product of phenyl isocyanate and N,N'—diethyl-1,3-propanediamine (catalyst) | 1.4 parts |

A prepreg tape is prepared following the general procedure of Example 15, with a 35 to 45 preferably 40% resin/55 to 65, preferably, 60% graphite loading. When this is formed into laminates by the procedure of Example 14, excellent quality composites are produced. Preferred ranges of compositions are (a), 94–126 parts; (b), 14.25–15.75 parts; (c) 45.6–50.4 parts; (d), 0.5–2.5 parts.

The above-mentioned patents, applications and publications are incorporated herein by reference. It is seen that the present invention produces articles of manufacture with beneficial properties, making them useful in a variety of applications. Many variations will suggest themselves to those skilled in this art in light of the foregoing detailed description. All such obvious variations are within the full intended scope of the appended claims.

What is claimed is:

1. A fiber resin matrix composition comprising:
   A. reinforcing filaments, and
   B. a heat curable epoxy resin composition comprising:
      (a) an epoxy prepolymer or combination of prepolymers having more than one epoxide group per molecule, and
      (b) a curing catalyst for said epoxy consisting essentially of
         (i) An amount effective to cure said epoxy of a bisurea compound comprising the reaction product of an organic diamine with at least two moles, per mole of organic diamine, of an aryl monoisocyanate, alone, or in further combination with
         (ii) an amount effective to cure said epoxy of an amine functional aromatic curing agent and, optionally,
      (c) a second homogenous or heterogeneous resin component blended and alloyed with components (a), (b)(i) and (b)(ii) in an amount sufficient to enhance toughness and resistance to failure under hot/wet stress conditions in composites produced from said composition.

2. A fiber resin matrix composition as defined in claim 1 comprised of:
   A. non-siliceous reinforcing filaments,
   B. a heat-curable epoxy resin composition comprising:
      (a) an epoxy prepolymer or combination of prepolymers having more than one epoxide group per molecule, and
      (b)(i) an amount effective to cure said epoxy of a bisurea compound of the formula

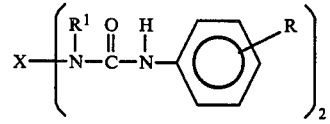

wherein X is a divalent organic hydrocarbon radical, a divalent or trivalent hetero-interrupted hydrocarbon radical, or a divalent inertly-substituted hydrocarbon radical, R is hydrogen, a monovalent hydrocarbon radical, an amino or hydrocarbon substituted amino radical, a cyano radical, a hydrocarbonoxy radical or an inertly-substituted such radical, and R$^1$ is, independently, hydrogen, a monovalent hydrocarbon radical, an inertly-substituted hydrocarbon radical, a single bond, or a divalent alkylene radical or inertly-substituted such radical, alone or in combination with (b)(ii) an amount effective to promote cure of said epoxy an amine functional curing agent selected from those of the formula:

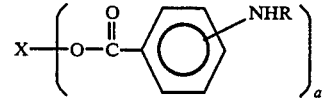

wherein a is 2 or 3, R is hydrogen, alkyl or aryl, and X is divalent or trivalent organic hydrocarbon, hetero-interrupted hydrocarbon, or substituted hydrocarbon radical or

and (c) a second homogeneous or heterogeneous resin modifier component blended and alloyed with composition (a), (b)(i) and (b)(ii) in an amount sufficient to enhance toughness and resistance to failure under hot/wet stress conditions in composites produced from said composition.

3. A matrix composition as defined in claim 1 wherein component (c) comprises from about 5 to about 50 parts by weight per 100 parts by weight of component (a).

4. A matrix composition as defined in claim 2 wherein said curing agent (b)(ii) comprises a compound of the formula:

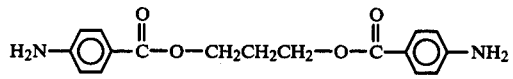

5. A matrix composition as defined in claim 2 wherein said second resin (c) comprises a compound of the formula:

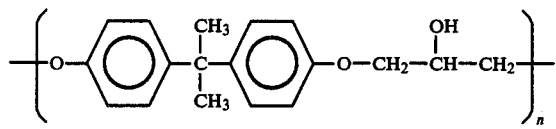

6. A matrix composition as in claim 2 wherein said second resin (c) comprises a compound of the formula

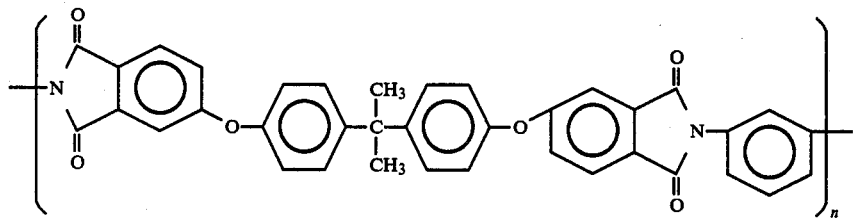

7. A matrix composition as defined in claim 1 wherein said filaments A comprise carbon or graphite filaments.

8. A matrix composition as defined in claim 2 wherein in said bisurea compound (b) X is $-(CH_2)_3$, $R^1$ is $-CH_2CH_3$, and R is H.

9. A fiber resin matrix composition as defined in claim 2 comprised of:
  A. a reinforcing amount of reinforcing filaments, and
  B. a heat curable epoxy resin composition comprising
    (a) N,N,N',N'-tetraglycidyl-4,4'-diaminodiphenyl methane;
    (b)(i) reaction product of phenyl isocyanate and N,N'-diethyl-1,3-propanediamine,
    (b)(ii) trimethylene bis(p-aminobenzoate) and;
    (c) a resinous reaction product of bisphenol A and epichlorohydrin of the general formula

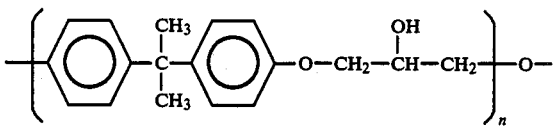

10. A fiber resin matrix composition as defined in claim 1 wherein, in component B, (a) comprises 100 parts by weight, component (b)(i) comprises 0.25 to 20 parts by weight, component (b)(ii) comprises 10 to 55 parts by weight, and component (c) comprises 5 to 20 parts by weight.

* * * * *